United States Patent [19]
Hackett et al.

[11] Patent Number: 5,642,170
[45] Date of Patent: Jun. 24, 1997

[54] METHOD AND APPARATUS FOR MOTION COMPENSATED INTERPOLATION OF INTERMEDIATE FIELDS OR FRAMES

[75] Inventors: Andrew Hackett, Klingenthal, France; Michael Knee, Petersfield, United Kingdom; Michel Kerdranvat, Bischoffsheim; Nadine Bolender, Strasbourg, both of France

[73] Assignee: Thomson Consumer Electronics, S.A., Courbevoie, France

[21] Appl. No.: 315,397

[22] Filed: Sep. 30, 1994

[30] Foreign Application Priority Data

Oct. 11, 1993 [DE] Germany ............................. 93402505
Nov. 2, 1993 [DE] Germany ............................. 93117662

[51] Int. Cl.⁶ ........................................................ H04N 7/01
[52] U.S. Cl. ........................... 348/459; 348/447; 348/620
[58] Field of Search ................................. 348/452, 447, 348/443, 448, 451, 458, 459, 699, 426, 429, 430, 431, 432, 437, 438, 440, 397, 399, 401, 402, 407, 415, 416, 417, 418, 620; H04N 7/01, 7/12

[56] References Cited

U.S. PATENT DOCUMENTS

| Re. 32,358 | 2/1987 | Powers | 348/451 |
|---|---|---|---|
| 4,873,573 | 10/1989 | Thomas et al. | 348/416 |
| 5,057,921 | 10/1991 | Robert et al. | 348/459 |
| 5,325,199 | 6/1994 | Childs | 348/459 |

OTHER PUBLICATIONS

Signal Processing of HDTV; 29 Feb. –2 Mar. 1988, L'Aquilla, Italy, pp. 393–399, Fernando et al., "Motion Compensated Display Conversion".

Research Disclosure No. 346 Feb. 1993, Havant GB, Anonymous, "Field Number Conversion Filtering".

Signal Processing of HDTV, II; 30 Aug. –1 Sep. 1989 Turin, Italy, pp. 649–655, Haghiri et al., "A Motion Compensated Field Rate Conversion Algorithm".

IEEE 1990 International Conference on Consumer Electronics; 6–8 Jun. 1990; Rosemont, US, Dreier, "100 Hz Conversion with Adaptive Line Flicker Reduction".

*Primary Examiner*—Michael H. Lee
*Attorney, Agent, or Firm*—Joseph S. Tripoli; Frederick A. Wein

[57] ABSTRACT

An appearance of a double image around moving objects may be reduced or removed by generating motion compensated 100 Hz fields with the objects in correct positions. When, however, the results of this technique are applied to motion compensated upconversion, objects or parts of the picture which fall outside the range of measurable velocities appear on the upconverted display with a very strong double image, resulting from the display of information in the wrong temporal position generated by uncompensated or 'fallback processing'. The subjective strength of the double image may be reduced by low pass filtering in a horizontal direction the components in the new fields of the upconverted signal which cause this double image.

14 Claims, 4 Drawing Sheets

METHOD AND APPARATUS FOR MOTION COMPENSATED INTERPOLATION OF INTERMEDIATE FIELDS OR FRAMES

FIELD OF THE INVENTION

The present invention relates to a method and to an apparatus for motion compensated interpolation of intermediate fields or frames.

BACKGROUND OF THE INVENTION

Current television transmission standards in Europe and other parts of the world operate with a 50 Hz display refresh rate. One complete image, or frame, is transmitted every 1/25th of a second. Each frame is composed of two half-images, or fields, each one of which is transmitted every 1/50th of a second. Each field consists of either the odd or even lines of a frame. The process of refreshing a CRT display causes a change of light intensity with time, called flicker. At 50 Hz, the human eye is still sensitive to this flicker, and on bright scenes and/or large displays this flicker is noticeable. One method of removing the visibility of this flicker is to refresh the display at a higher frequency. This increase in field rate may be by any arbitrary amount as long as a frequency is chosen which is sufficiently great that the sensitivity of the eye is very low. The frequency used as an example in this description is 100 Hz, a doubling in frequency which results in a relatively simple hardware implementation, although in principle, any frequency may be used and 75 Hz has also been comtemplated.

With the example frequency of 100 Hz, there are two scanning patterns which may be used, these are known as AABB and ABAB, where the letters A and B refer to the positions of the odd and even fields F. The arrangements of the two types of scanning is shown in FIGS. 1A and 1C. Lines L which belong to the original input signal are marked by a 'o' and new lines which must be created are marked by a 'x'.

The data in the new fields may be generated from the original input signal as illustrated by the arrows in FIG. 1. This presents an acceptable picture quality when the images are static. When the images move, the subjective effect in each case is one of a double image. This is due to the data in the new fields being displayed in the wrong temporal position, and when the eye tracks the motion across the screen, a double image of one form or another results. This effect is shown in FIGS. 1B and 1D, the latter of which shows 'mouth teeth' artifacts.

This appearance of a double image around moving objects may be reduced or removed by generating the new 100 Hz fields with the object in the correct position. This is done by measuring the velocity with which the object is moving and then interpolating the new field using information from the correct position (i.e., from the object) in the source fields. This technique is called motion compensated interpolation, and in this instance is applied to frame/field rate upconversion, but could equally well have other uses, for example in the generation of an improved slow motion video signal, or in standards conversion.

One technique of motion estimation is known as block matching. Typically, the current field or frame of the picture is divided into rectangular blocks. For each block, a search is made over overlapping blocks in the previous field or frame to find the one that matches the current field block the best according to some criterion, typically mean-square or mean absolute error. The relative position of the two blocks gives the displacement, or motion, vector for the current block.

SUMMARY OF THE INVENTION

It is one object of the invention to disclose a method of improved fallback processing.

It is a further object of the invention to disclose an apparatus which utilizes the inventive method.

In principle, the inventive method is suited for motion compensated interpolation of intermediate fields or flames of a input video signal using pixel block motion vectors, whereby in case of related motion velocities exceeding a preselected range or in case said motion vectors cannot be determined, a fallback interpolation is performed in which pixel values of the intermediate fields or frames are lowpass filtered horizontally and whereby the filtering is active over a region comparable in size of double image artifacts caused by the missing motion compensated interpolation.

In principle the inventive apparatus for motion compensated interpolation of intermediate fields or flames of an input video signal using pixel block motion vectors includes:
  motion compensated interpolation means and fallback interpolation means which receive said input video signal and the output pixel values of which are selected by a switching means in relation to said motion vector or its horizontal component, whereby in said fallback interpolation means pixel values of the intermediate fields or frames are lowpass filtered horizontally and whereby the filtering is active over a region comparable in size of double image artifacts caused by the missing motion compensated interpolation;
  motion estimation means which calculate from said input signal, or motion information extractor means which extract from the transmitted input signal data stream, said block based motion vector and/or its horizontal component, whereby in case of said motion vector or its horizontal component exceeding a preselected range or in case of said motion vector cannot be determined said fallback interpolation means are selected by said switching means.

BRIEF DESCRIPTION OF THE DRAWING

Preferred embodiments of the invention are described with reference to the accompanying drawing, wherein.

DETAILED DESCRIPTION

The above described motion estimation principle holds whether single or double sided block matching is used. Double sided block matching and its advantages are described in EP-A-93402187 of the applicant.

Figure 2:
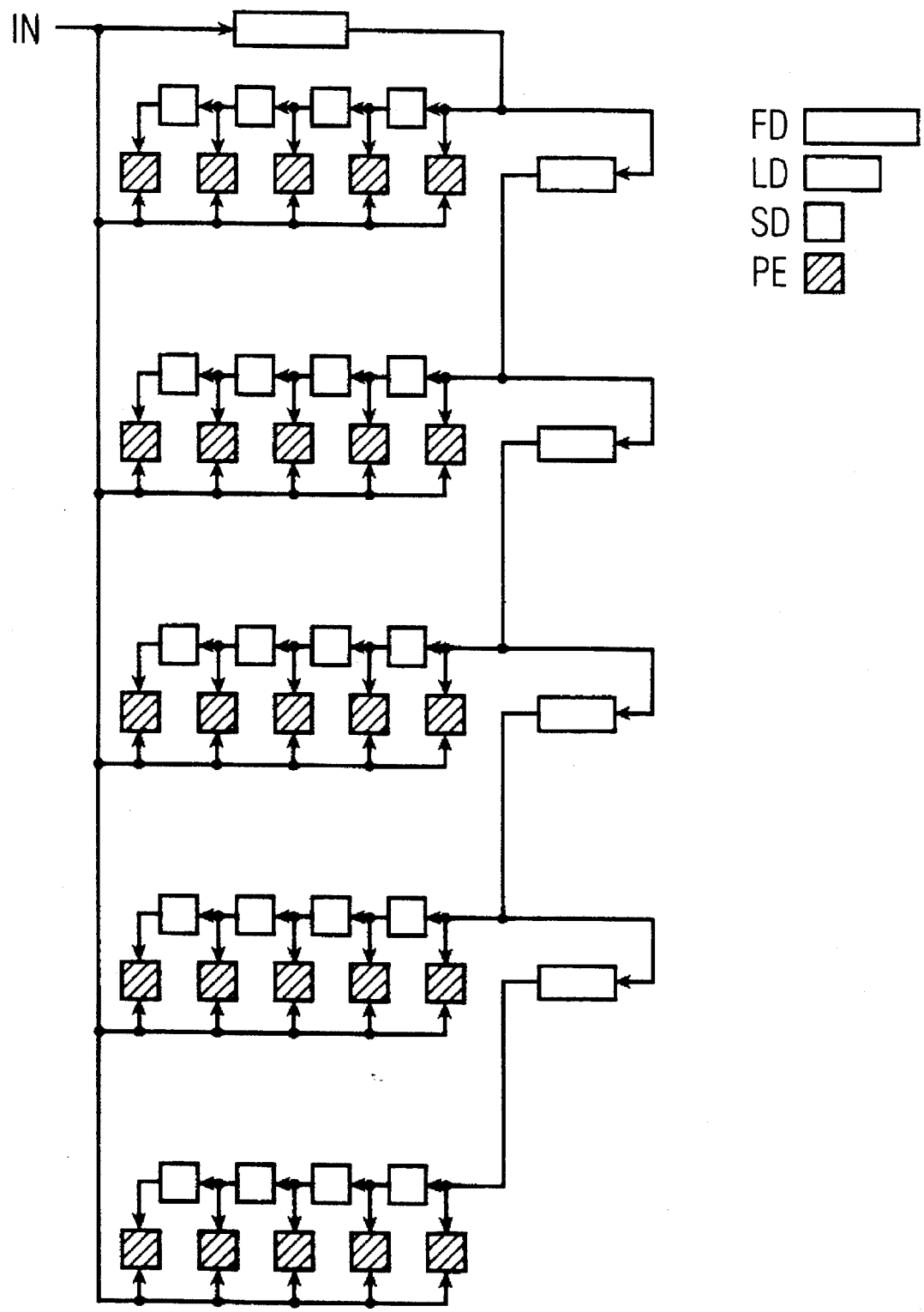
FIG. 2 is a block diagram illustrating an architecture for one-sided block mashing.

As block matching is computationally intensive, real-time hardware implementations of this technique indicate the desirability of some form of parallel processing. The most common form is to have one block matching processor per candidate motion vector. An example hardware implementation for a single sided block matching scheme is shown in FIG. 2. This implementation allows the measurement of velocities of up to ±2 pixels or lines in the horizontal and vertical directions. Each processing element matches, in parallel, the current block with those in the previous field or frame displaced by ±2 pixels or lines.

In order to give good results in all cases, the block search range should cover all possible motion vectors which may be present in the incoming signal. As the number of processing elements is directly related to the complexity, and hence cost, of the hardware implementation, there is some incentive to minimize the number of candidate vectors which must be checked.

As described in EP-A-93402059 of the applicant, one method of reducing the hardware cost is to cover only a limited range of possible motion vectors within the image, and to cover some of this range with reduced precision.

Figure 1D:
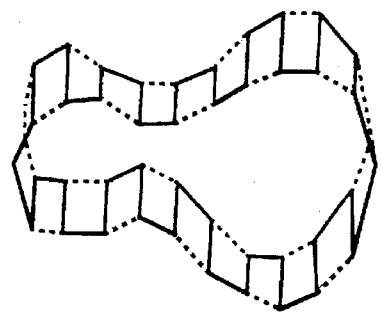
FIGS. 1A–1D are diagrams illustrating AABB and ABAB scanning for upconversion and resulting artifacts.
Figure 1C:
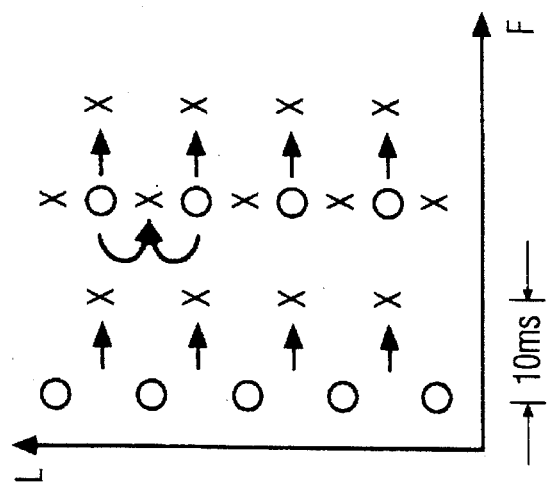
Figure 1B:
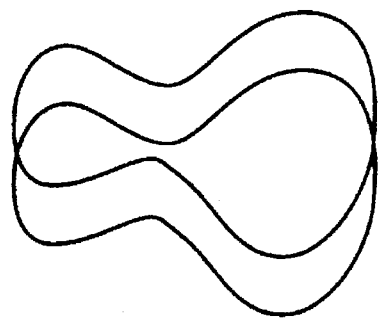
Figure 1A:
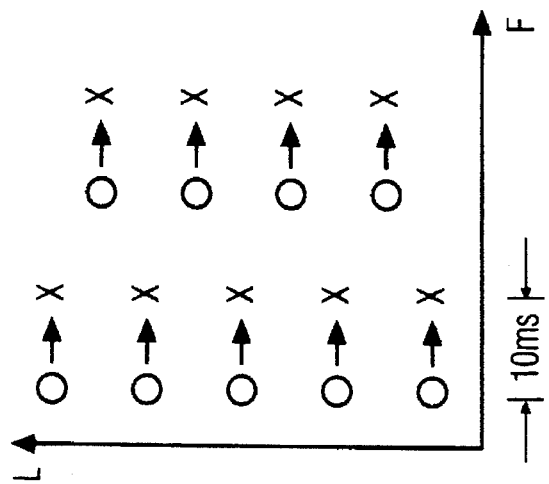
Figure 3:
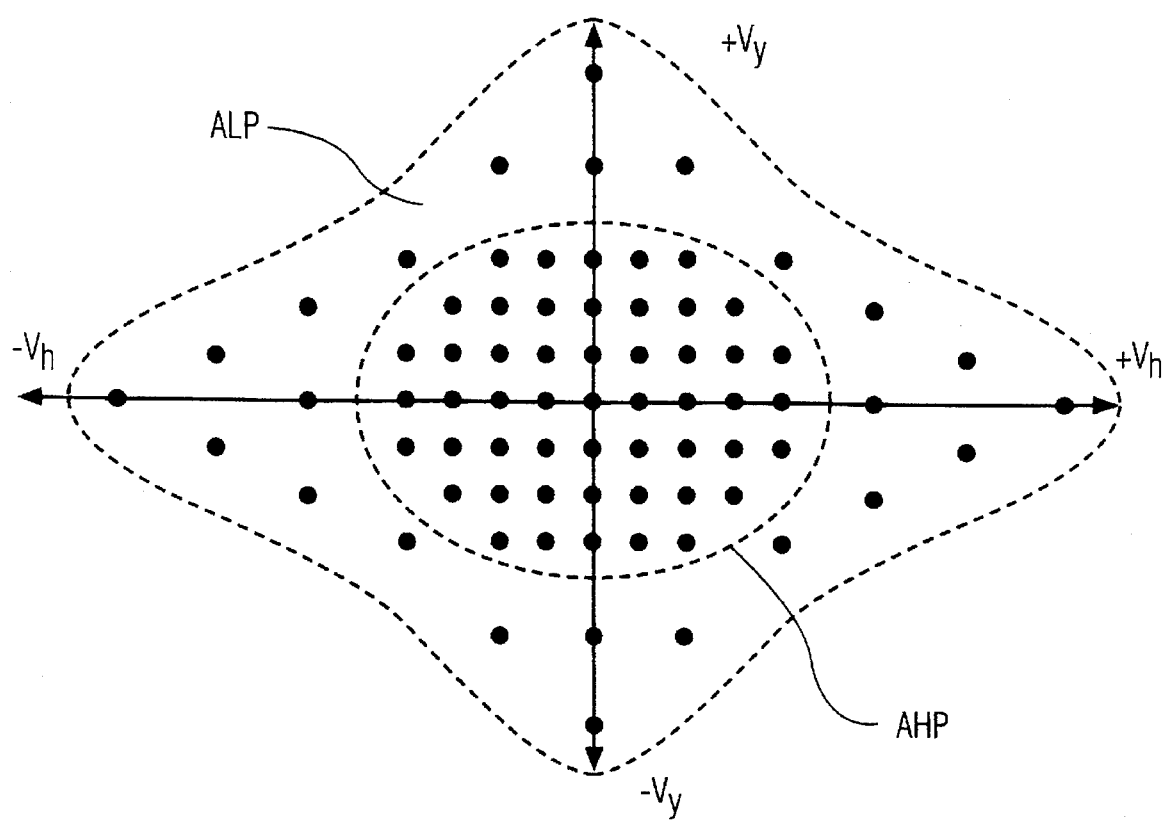
FIG. 3 is a two-dimensional vector velocity space diagram with motion vector processor sites illustrating an example configuration of reduced coverage of motion vector processors.
Figure 4:
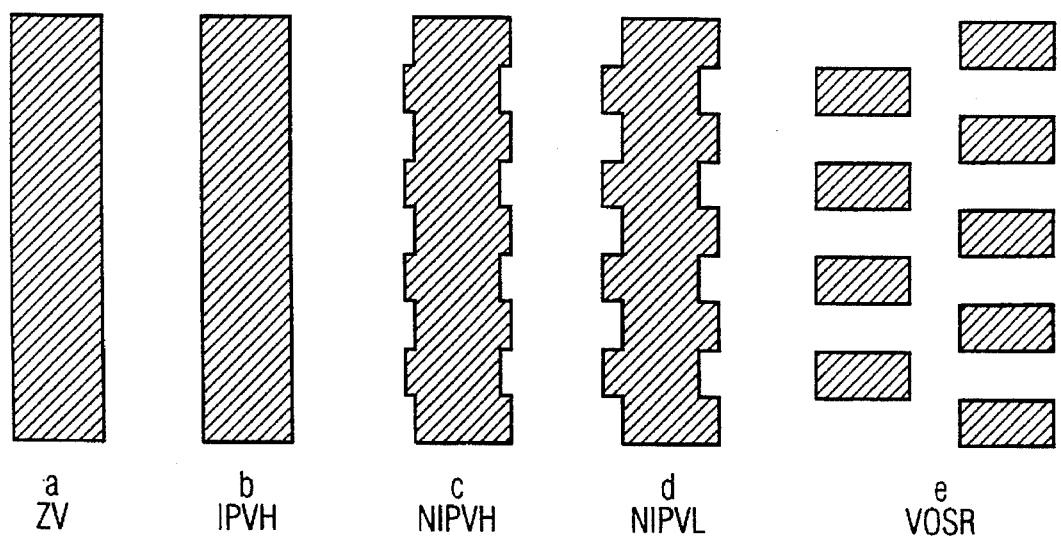
FIG. 4a–e are illustrating the appearance of a moving object acclerating horizontally through the velocity space of FIG. 3.

An example of this related to motion compensated flame/field rate upconversion is shown in FIG. 3 where '●' is a site of a motion vector processor in the two-dimensional velocity space $V_y/V_x$. The motion estimation is performed (within area AHP of high precision) with a good precision of small or slow motion and as the velocity of the object increases, the precision of the estimation decreases (within area ALP of low precision). Finally, there is a limiting velocity (uncompensated region UCR) beyond which no motion estimation is performed and where compensation is therefore impossible and a fallback processing is required instead. It is with respect to this uncompensated region that the present invention relates. In addition, the invention is applicable to both scanning types shown in FIG. 1A and FIG. 1B.

As already mentioned, economic factors rule against the implementation of a motion compensated upconversion scheme which is capable of applying motion compensated upconversion for all possible velocities of objects which may be contained within the incoming television signal. The fallback processing treats the case where the velocity of an object, or pan across a scene exceeds the maximum velocity supported by the motion estimation system. FIGS. 4a-4e shows one possible effect at the edge of a moving object as the object accelerates through the range of velocities shown in FIG. 3, when viewed after a typical upconversion process. The object starts from rest (zero velocity ZV, FIG. 4a). As the object accelerates, the error in the motion is well compensated (integer pixel velocity IPVH and non-integer pixel velocity NIPVH in region AHP of high precision) until the region of lower precision measurement is reached (non-integer pixel velocity NIPVL in region ALP of low precision), which can be considered acceptable as the human visual system does not register such small defects on an object moving with a relatively high velocity. What is unacceptable, is the abrupt change as the edge of the motion compensated velocity region is crossed (velocity VOSR outside of supported region AHP and ALP). The image will abruptly change from the appearance in FIG. 4b, 4c or 4d to that of FIG. 4e.

Referring back to FIGS. 1A and 1C, it can be seen that this will result in a sudden change in parts of the image, from a high quality single moving image to a low quality double image, with or without 'mouse-teeth' depending on the type of upconversion in use. It is the purpose of the inventive fallback processing to improve the subjective appearance of images moving with a velocity too large to be correctly compensated.

It can be seen from FIG. 1 that the images which are in the wrong temporal position are those of the new fields (marked by 'x's). Considering the case in FIG. 1A of the AABB type scanning (ABBAB is similar), the complete image is already present in the correct temporal position in the original fields.

When motion compensated processing is impossible, the new fields may be generated by non-compensated methods, such as repeating the original fields, or by generating a progressive scan image and delaying alternate lines by 10 ms. The subjective appearance of the double image is then significantly improved by heavily low pass filtering the new fields in the horizontal direction. The filtering must be active over a region comparable in size to the double image.

The effect of this filtering is to remove any significant detail from the newly interpolated fields. The filtering process blurs the fields which are displayed with information in the wrong temporal position. This blurring in every second field of a 100 Hz video signal is acceptable as the human visual system does not register it on an object moving with high velocity. As detail is only present in fields with information present in the correct temporal position, the subjective strength of the double image is greatly reduced, resulting in a greatly improved subjective picture quality. In this implementation, the fallback processing is applied to the new fields when a motion vector cannot be determined, that is normally when the velocity lies in the uncompensated region UCR.

FIG. 2 shows a possible architecture for one-sided block matching motion estimators with a range of ±2 pixels per field horizontally and vertically, to integer accuracy. The architecture is based on processing elements PE, one per candidate motion vector. Each processing element PE accumulates the errors between the pixels (which form a group related to a candidate block position and vector, respectively) arriving at its two inputs, storing partial results in order to arrive at a total error for each block. The processing elements are connected together by comparison means (not shown) in order to find which one yields the minimum error for each block. The processing elements may calculate, illustratively, the minimum absolute error value or the minimum squared error.

All the processing elements PE have a common input IN, corresponding to the current block. The relative displacements between the pixels in the search window are provided by a network of line LD and sample SD delays that follow the field delay FD connected to input INP.

Figure 5:
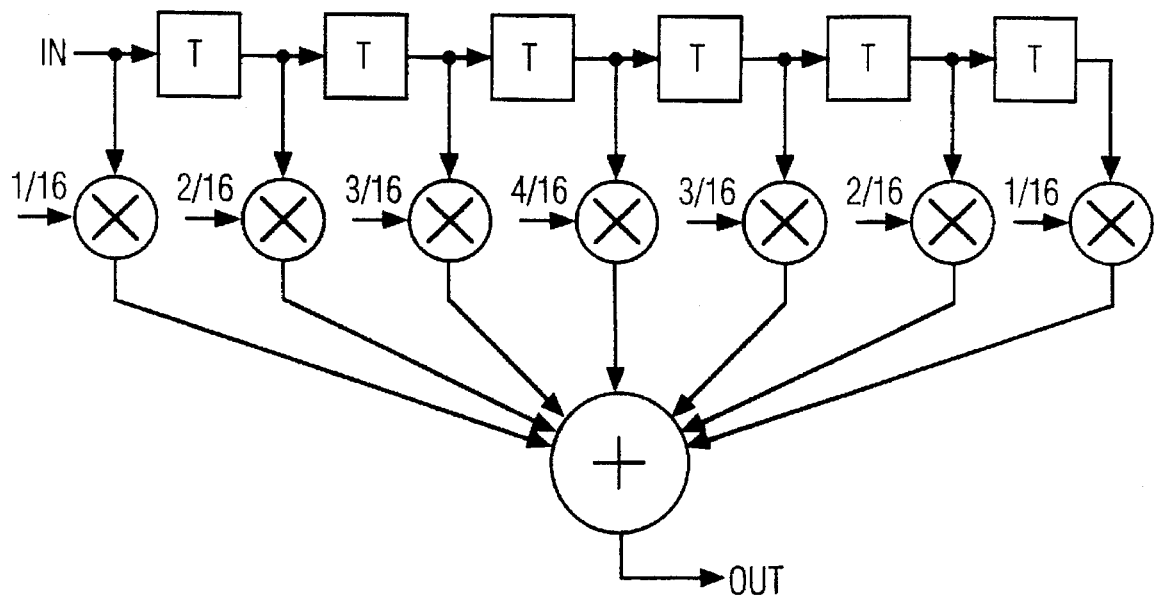
FIG. 5 is a block diagram illustrating a FIR (finite impulse response) low pass filter suitable for use as a fallback processing filter in the present invention.

The fallback processing low pass filter in FIG. 5 is a finite impulse response (FIR) filter having a linear phase response. The input signal (i.e. the 'x' pixels in the lines of FIG. 1) it passed through a chain of one horizontal sample delays T. The respective delayed output pixel values and the pixel values of the input signal IN are multiplied by the filter coefficients $1/16$, $2/16$, $3/16$, $4/16$, $3/16$, $2/16$, $1/16$ in multipliers X. The multiplier outputs are combined in adder '+' to form the final output pixel values OUT for the intermediate fields.

Figure 6:
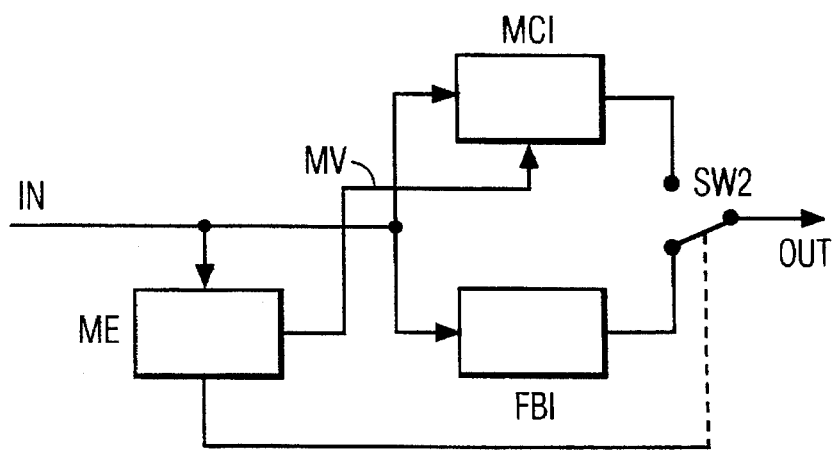
FIG. 6 is a simplified block diagram of apparatus embodying the invention.

In the motion compensated interpolation apparatus of FIG. 6, embodying the invention, the 50/60 HZ input signal IN passes through a motion compensated interpolation circuit MCI or a fallback interpolation circuit FBI and a switch SW to the 100/120 Hz output. Circuit ME can be a motion estimator which calculates related motion vectors MV from the input signal In and controls switch SW by detecting strongly moving picture areas in which no motion estimation can be performed. This information can also be transmitted if the motion estimator is located within a transmitter and the circuit of FIG. 6 is part of a receiver, e.g. a TV receiver. Then, circuit ME may extract the motion vector MV and the information on non-motion estimated picture areas from the transmitted input signal data stream. The motion information is used in interpolator MCI to perform the motion compensated interpolation of the intermediate fields. Switch SW can also operate as a soft switch smoothing the MCI/FBI transition at the outer boundary of area ALP. Circuit ME may include a circuit according to FIG. 2. Interpolation circuit FBI may include a filter according to FIG. 5.

In the case of a uniform moving edge, the motion vector is only valid in the direction perpendicular to the edge. In the example given, the fallback processing is limited (for reasons of cost) to horizontal filtering. Therefore, one implementation could be to limit the application of the fallback mode to cases when the horizontal component of the velocity only is out of range (i.e. in the case of edges, operate solely on vertical edges). Another possibility, as described in the accompanying patent application EP 93 402506 of the applicant could be to control the application of the fallback mode processing through some intermediate form of vector conditioning, such as a measure of confidence.

The invention can also be used for standards conversion, bit rate reduction, digital HDTV, digital VCR, digital video disc player and MPEG1 or MPEG2 devices (IEC/ISO standard).

What is claimed is:

1. A method, for generating intermediate fields or frames of a video signal using motion information, comprising the following steps:

performing motion compensated interpolation for generating said intermediate fields or frames of said video signal when valid motion information can be determined;

performing a fallback interpolation when related motion velocities exceed a preselected range or when valid motion information cannot be determined, said fallback interpolation comprising constructing a field or frame of said video signal using a preceding original field or frame of said video signal and without using said motion compensated interpolation;

horizontally low pass filtering pixel values of the constructed field or frame; and applying said low pass filtering actively over a region comparable in size to double image artifacts which tend to be produced due to the non-use of said motion compensated interpolation when performing said fallback interpolation.

2. A method according to claim 1 wherein said fallback interpolation is performed only when a horizontal component of said motion velocity exceeds said preselected range.

3. A method according to claim 1 wherein said fallback interpolation is performed only when a horizontal component of said motion velocity exceeds said preselected range; and said fallback interpolation is performed in relation to a measure of confidence of a motion vector.

4. A method according to claim 1 wherein a soft switching is performed between said motion compensated interpolation and said fallback interpolation.

5. A method according to claim 2 wherein a soft switching is performed between said motion compensated interpolation and said fallback interpolation.

6. A method according to claim 3 wherein a soft switching is performed between said motion compensated interpolation and said fallback interpolation.

7. A method according to claim 1, wherein said related motion velocities include at least a horizontal component and wherein said fallback interpolation is performed only when the horizontal component of the motion velocity exceeds said preselected range.

8. A method according to claim 1, wherein said fallback interpolation is performed in relation to a measure of confidence of said motion vector.

9. Apparatus, for generating intermediate fields or frames of a video signal using motion information, comprising the following steps:

motion compensating interpolation means performing motion compensated interpolation for generating said intermediate fields or frames of said video signal when valid motion information can be determined;

fallback interpolation means for performing a fallback interpolation when related motion velocities exceed a preselected range or when valid motion information cannot be determined, said fallback interpolation means including means for constructing a field or frame of said video signal using a preceding original field or frame of said video signal and without using said motion compensated interpolation;

low pass filter means for horizontally low pass filtering pixel values of the constructed field or frame, said low pass filter means applying filtering actively over a region comparable in size to double image artifacts which tend to be produced due to the non-use of said motion compensated interpolation when performing said fallback interpolation; and switching means for selecting as an output (i) the intermediate fields or frames provided by said motion compensating interpolation means or (ii) the intermediate fields or flames provided by said fallback interpolation means.

10. Apparatus according to claim 9, wherein said switching means (SW) are soft switching means.

11. Apparatus according to claims 10 or 9, said apparatus is part of a digital TV or HDTV receiver or a digital VCR or a digital video disc player.

12. Apparatus according to claim 9 wherein said switching means comprise soft switching means.

13. Apparatus according to any of claims 9 and 12 further comprising utilization means for using the output of said switching means and including a digital television receiver, a high definition television receiver, a digital video cassette recorder or a digital video disc player.

14. A method according claim 1 wherein a soft switching is performed between said motion compensated interpolation and said fallback interpolation.

* * * * *